United States Patent
Marty

(10) Patent No.: US 12,473,417 B2
(45) Date of Patent: *Nov. 18, 2025

(54) METHOD FOR THE ENZYMATIC DEGRADATION OF POLYETHYLENE TEREPHTHALATE

(71) Applicant: CARBIOS, Clermont-Ferrand (FR)

(72) Inventor: Alain Marty, Toulouse (FR)

(73) Assignee: CARBIOS, Clermont-Ferrand (FR)

( * ) Notice: Subject to any disclaimer, the term of this patent is extended or adjusted under 35 U.S.C. 154(b) by 856 days.

This patent is subject to a terminal disclaimer.

(21) Appl. No.: 17/291,291

(22) PCT Filed: Nov. 5, 2019

(86) PCT No.: PCT/EP2019/080253
§ 371 (c)(1),
(2) Date: May 5, 2021

(87) PCT Pub. No.: WO2020/094646
PCT Pub. Date: May 14, 2020

(65) Prior Publication Data
US 2022/0363861 A1    Nov. 17, 2022

(30) Foreign Application Priority Data
Nov. 6, 2018    (FR) ..................... 1860222

(51) Int. Cl.
*C08J 11/10*    (2006.01)
*C12N 9/18*    (2006.01)

(52) U.S. Cl.
CPC .............. *C08J 11/105* (2013.01); *C12N 9/18* (2013.01); *C08J 2367/02* (2013.01); *C12Y 301/01074* (2013.01)

(58) Field of Classification Search
CPC ..... C08J 11/105; C08J 2367/02; Y02W 30/62
See application file for complete search history.

(56) References Cited

U.S. PATENT DOCUMENTS

| | | |
|---|---|---|
| 10,124,512 B2 | 11/2018 | Boisart et al. |
| 10,287,561 B2 | 5/2019 | Alvarez et al. |
| 10,385,183 B2 | 8/2019 | Maille |
| 10,508,269 B2 | 12/2019 | Li et al. |
| 10,584,320 B2 * | 3/2020 | Topham ............. C08J 11/105 |
| 10,590,401 B2 | 3/2020 | Tournier et al. |
| 10,626,242 B2 | 4/2020 | Ferreira et al. |
| 10,717,996 B2 | 7/2020 | Dusseaux et al. |
| 10,723,848 B2 | 7/2020 | Chateau et al. |
| 10,767,026 B2 * | 9/2020 | Desrousseaux ........ C08J 11/105 |
| 10,829,598 B2 | 11/2020 | Ferreira et al. |
| 10,829,754 B2 | 11/2020 | Marty et al. |
| 11,072,784 B2 * | 7/2021 | Tournier ............. C12N 15/52 |
| 11,198,767 B2 | 12/2021 | Guemard et al. |
| 11,345,906 B2 | 5/2022 | Marty et al. |
| 11,370,890 B2 | 6/2022 | Ferreira et al. |
| 11,377,533 B2 * | 7/2022 | Desrousseaux ......... C08J 11/14 |
| 11,384,218 B2 | 7/2022 | Guemard et al. |
| 11,414,651 B2 * | 8/2022 | Topham ................ C08J 11/105 |
| 11,535,832 B2 | 12/2022 | David et al. |
| 11,851,689 B2 * | 12/2023 | Duquesne ...... C12Y 301/01074 |
| 2017/0114205 A1 * | 4/2017 | Maille .................... B29B 17/02 |
| 2018/0142097 A1 | 5/2018 | Guemard et al. |
| 2020/0190279 A1 | 6/2020 | Guemard et al. |
| 2020/0339766 A1 | 10/2020 | Chateau et al. |
| 2020/0385698 A1 | 12/2020 | Marty et al. |
| 2020/0392303 A1 | 12/2020 | Desrousseaux et al. |
| 2021/0009980 A1 | 1/2021 | Marty et al. |
| 2021/0163906 A1 | 6/2021 | David et al. |
| 2021/0171921 A1 | 6/2021 | Andre et al. |
| 2021/0180037 A1 | 6/2021 | Duquesne et al. |
| 2021/0261931 A9 | 8/2021 | Topham et al. |
| 2022/0002516 A1 | 1/2022 | Chateau |
| 2022/0177697 A1 | 6/2022 | Guillamot et al. |
| 2022/0227957 A1 | 7/2022 | Guemard et al. |
| 2022/0251327 A1 | 8/2022 | Marty et al. |
| 2022/0282232 A1 | 9/2022 | Tournier |
| 2022/0282235 A1 | 9/2022 | Duquesne et al. |

FOREIGN PATENT DOCUMENTS

| | | | |
|---|---|---|---|
| WO | WO-2012099018 A1 * | 7/2012 | ............... C12N 9/18 |
| WO | WO 2017/198786 | 11/2017 | |
| WO | WO 2018/011284 | 1/2018 | |
| WO | WO 2021/123299 | 6/2021 | |
| WO | WO 2021/123301 | 6/2021 | |
| WO | WO 2021/123328 | 6/2021 | |

OTHER PUBLICATIONS

Gamerith et al. 2017. "Enzymatic recovery of polyester building blocks from polymer blends". Process Biochemistry, 59, 58-64 (Year: 2017).*

Thomsen et al., 2023. Significance of poly(ethylene terephthalate)(PET) substrate crystallinity on enzymatic degradation. New Biotechnology, 78, 162-172 (Year: 2023).*

Ronkvist, Åsa M., et al. "Cutinase-catalyzed hydrolysis of poly (ethylene terephthalate)." Macromolecules 42.14 (2009): 5128-5138. https://doi.org/10.1021/ma9005318 (Year: 2009).*

Machine-generated English translation of WO2012099018. 20 pages total. (Year: 2012).*

Acero, E. H. et al. "Enzymatic Surface Hydrolysis of PET: Effect of Structural Diversity on Kinetic Properties of Cutinases from *Thermobifida*" Macromolecules, May 20, 2011, pp. 4632-4640, vol. 44, No. 12.

(Continued)

*Primary Examiner* — Aaron J Kosar
*Assistant Examiner* — Andrew T Moehlman
(74) *Attorney, Agent, or Firm* — SALIWANCHIK, LLOYD & EISENSCHENK

(57) ABSTRACT

The present invention relates to a process for enzymatic depolymerization of polyethylene terephthalate (PET), in particular contained in a plastic material. The process according to the invention can in particular be implemented on an industrial or semi-industrial scale.

17 Claims, 1 Drawing Sheet
Specification includes a Sequence Listing.

(56) References Cited

OTHER PUBLICATIONS

Written Opinion in International Application No. PCT/EP2019/080253, Nov. 29, 2019, pp. 1-6.
Claims as filed in U.S. Appl. No. 17/786,566, corresponding to WO 2021/123299, Jun. 17, 2022, pp. 1-4.
Claims as filed in U.S. Appl. No. 17/786,580, corresponding to WO 2021/123301, Jun. 17, 2022, pp. 1-4.
Claims as filed in U.S. Appl. No. 17/786,588, corresponding to WO 2021/123328, Jun. 17, 2022, pp. 1-4.

\* cited by examiner

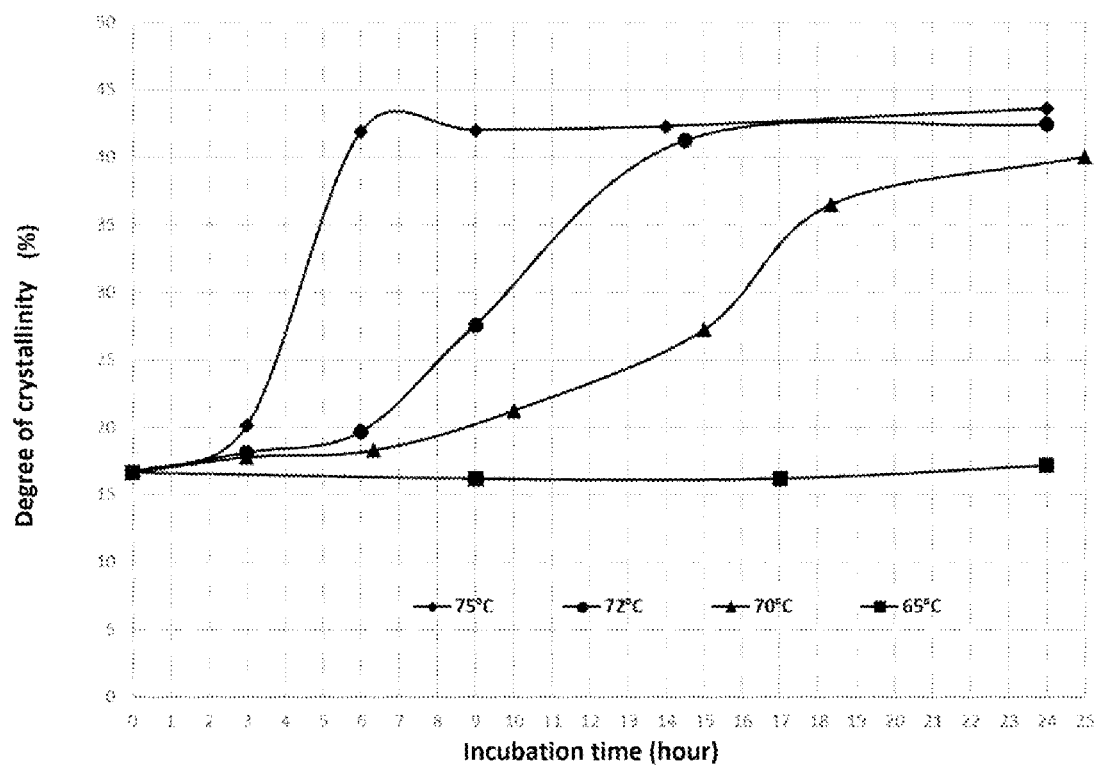

SEQUENCE LISTING

```
<160> NUMBER OF SEQ ID NOS: 5

<210> SEQ ID NO 1
<211> LENGTH: 258
<212> TYPE: PRT
<213> ORGANISM: artificial sequence
<220> FEATURE:
<223> OTHER INFORMATION: LC-Cutinase

<400> SEQUENCE: 1

Ser Asn Pro Tyr Gln Arg Gly Pro Asn Pro Thr Arg Ser Ala Leu Thr
1               5                   10                  15

Ala Asp Gly Pro Phe Ser Val Ala Thr Tyr Thr Val Ser Arg Leu Ser
            20                  25                  30
```

Val Ser Gly Phe Gly Gly Val Ile Tyr Tyr Pro Thr Gly Thr Ser
                35                  40                  45

Leu Thr Phe Gly Gly Ile Ala Met Ser Pro Gly Tyr Thr Ala Asp Ala
    50                  55                  60

Ser Ser Leu Ala Trp Leu Gly Arg Arg Leu Ala Ser His Gly Phe Val
65                  70                  75                  80

Val Leu Val Ile Asn Thr Asn Ser Arg Phe Asp Tyr Pro Asp Ser Arg
                85                  90                  95

Ala Ser Gln Leu Ser Ala Ala Leu Asn Tyr Leu Arg Thr Ser Ser Pro
            100                 105                 110

Ser Ala Val Arg Ala Arg Leu Asp Ala Asn Arg Leu Ala Val Ala Gly
            115                 120                 125

His Ser Met Gly Gly Gly Thr Leu Arg Ile Ala Glu Gln Asn Pro
        130                 135                 140

Ser Leu Lys Ala Ala Val Pro Leu Thr Pro Trp His Thr Asp Lys Thr
145                 150                 155                 160

Phe Asn Thr Ser Val Pro Val Leu Ile Val Gly Ala Glu Ala Asp Thr
                165                 170                 175

Val Ala Pro Val Ser Gln His Ala Ile Pro Phe Tyr Gln Asn Leu Pro
            180                 185                 190

Ser Thr Thr Pro Lys Val Tyr Val Glu Leu Asp Asn Ala Ser His Phe
            195                 200                 205

Ala Pro Asn Ser Asn Asn Ala Ala Ile Ser Val Tyr Thr Ile Ser Trp
        210                 215                 220

Met Lys Leu Trp Val Asp Asn Asp Thr Arg Tyr Arg Gln Phe Leu Cys
225                 230                 235                 240

Asn Val Asn Asp Pro Ala Leu Ser Asp Phe Arg Thr Asn Asn Arg His
                245                 250                 255

Cys Gln

<210> SEQ ID NO 2
<211> LENGTH: 258
<212> TYPE: PRT
<213> ORGANISM: artificial sequence
<220> FEATURE:
<223> OTHER INFORMATION: Poly(ethylene terephthalate) hydrolase
      [bacterium HR29]

<400> SEQUENCE: 2

Ser Asn Pro Tyr Gln Arg Gly Pro Asn Pro Thr Arg Ser Ala Leu Thr
1               5                   10                  15

Thr Asp Gly Pro Phe Ser Val Ala Thr Tyr Ser Val Ser Arg Leu Ser
                20                  25                  30

Val Ser Gly Phe Gly Gly Val Ile Tyr Tyr Pro Thr Gly Thr Thr
                35                  40                  45

Leu Thr Phe Gly Gly Ile Ala Met Ser Pro Gly Tyr Thr Ala Asp Ala
    50                  55                  60

Ser Ser Leu Ala Trp Leu Gly Arg Arg Leu Ala Ser His Gly Phe Val
65                  70                  75                  80

Val Ile Val Ile Asn Thr Asn Ser Arg Leu Asp Phe Pro Asp Ser Arg
                85                  90                  95

Ala Ser Gln Leu Ser Ala Ala Leu Asn Tyr Leu Arg Thr Ser Ser Pro
            100                 105                 110

Ser Ala Val Arg Ala Arg Leu Asp Ala Asn Arg Leu Ala Val Ala Gly
            115                 120                 125

His Ser Met Gly Gly Gly Ala Thr Leu Arg Ile Ser Glu Gln Ile Pro
    130                 135                 140

Thr Leu Lys Ala Gly Val Pro Leu Thr Pro Trp His Thr Asp Lys Thr
145                 150                 155                 160

Phe Asn Thr Pro Val Pro Gln Leu Ile Val Gly Ala Glu Ala Asp Thr
                165                 170                 175

Val Ala Pro Val Ser Gln His Ala Ile Pro Phe Tyr Gln Asn Leu Pro
                180                 185                 190

Ser Thr Thr Pro Lys Val Tyr Val Glu Leu Asp Asn Ala Thr His Phe
            195                 200                 205

Ala Pro Asn Ser Pro Asn Ala Ala Ile Ser Val Tyr Thr Ile Ser Trp
            210                 215                 220

Met Lys Leu Trp Val Asp Asn Asp Thr Arg Tyr Arg Gln Phe Leu Cys
225                 230                 235                 240

Asn Val Asn Asp Pro Ala Leu Ser Asp Phe Arg Ser Asn Asn Arg His
                245                 250                 255

Cys Gln

<210> SEQ ID NO 3
<211> LENGTH: 259
<212> TYPE: PRT
<213> ORGANISM: artificial sequence
<220> FEATURE:
<223> OTHER INFORMATION: enzyme

<400> SEQUENCE: 3

Met Ala Asn Pro Tyr Glu Arg Gly Pro Asp Pro Thr Glu Ser Ser Ile
1               5                   10                  15

Glu Ala Val Arg Gly Pro Phe Ala Val Ala Gln Thr Thr Val Ser Arg
                20                  25                  30

Leu Gln Ala Asp Gly Phe Gly Gly Gly Thr Ile Tyr Tyr Pro Thr Asp
            35                  40                  45

Thr Ser Gln Gly Thr Phe Gly Ala Val Ala Ile Ser Pro Gly Phe Thr
    50                  55                  60

Ala Gly Gln Glu Ser Ile Ala Trp Leu Gly Pro Arg Ile Ala Ser Gln
65                  70                  75                  80

Gly Phe Val Val Ile Thr Ile Asp Thr Ile Thr Arg Leu Asp Gln Pro
                85                  90                  95

Asp Ser Arg Gly Arg Gln Leu Gln Ala Ala Leu Asp His Leu Arg Thr
                100                 105                 110

Asn Ser Val Val Arg Asn Arg Ile Asp Pro Asn Arg Met Ala Val Met
            115                 120                 125

Gly His Ser Met Gly Gly Gly Ala Leu Ser Ala Ala Asn Asn
            130                 135                 140

Thr Ser Leu Glu Ala Ala Ile Pro Leu Gln Gly Trp His Thr Arg Lys
145                 150                 155                 160

Asn Trp Ser Ser Val Arg Thr Pro Thr Leu Val Val Gly Ala Gln Leu
                165                 170                 175

Asp Thr Ile Ala Pro Val Ser Ser His Ser Glu Ala Phe Tyr Asn Ser
                180                 185                 190

Leu Pro Ser Asp Leu Asp Lys Ala Tyr Met Glu Leu Arg Gly Ala Ser
            195                 200                 205

His Leu Val Ser Asn Thr Pro Asp Thr Thr Ala Lys Tyr Ser Ile
            210                 215                 220

```
Ala Trp Leu Lys Arg Phe Val Asp Asp Asp Leu Arg Tyr Glu Gln Phe
225                 230                 235                 240

Leu Cys Pro Ala Pro Asp Asp Phe Ala Ile Ser Glu Tyr Arg Ser Thr
                245                 250                 255

Cys Pro Phe

<210> SEQ ID NO 4
<211> LENGTH: 263
<212> TYPE: PRT
<213> ORGANISM: artificial sequence
<220> FEATURE:
<223> OTHER INFORMATION: enzyme Ideonella sp.

<400> SEQUENCE: 4

Gln Thr Asn Pro Tyr Ala Arg Gly Pro Asn Pro Thr Ala Ala Ser Leu
1               5                   10                  15

Glu Ala Ser Ala Gly Pro Phe Thr Val Arg Ser Phe Thr Val Ser Arg
            20                  25                  30

Pro Ser Gly Tyr Gly Ala Gly Thr Val Tyr Tyr Pro Thr Asn Ala Gly
        35                  40                  45

Gly Thr Val Gly Ala Ile Ala Ile Val Pro Gly Tyr Thr Ala Arg Gln
    50                  55                  60

Ser Ser Ile Lys Trp Trp Gly Pro Arg Leu Ala Ser His Gly Phe Val
65                  70                  75                  80

Val Ile Thr Ile Asp Thr Asn Ser Thr Leu Asp Gln Pro Ser Ser Arg
                85                  90                  95

Ser Ser Gln Gln Met Ala Ala Leu Arg Gln Val Ala Ser Leu Asn Gly
            100                 105                 110

Thr Ser Ser Ser Pro Ile Tyr Gly Lys Val Asp Thr Ala Arg Met Gly
        115                 120                 125

Val Met Gly Trp Ser Met Gly Gly Gly Gly Ser Leu Ile Ser Ala Ala
    130                 135                 140

Asn Asn Pro Ser Leu Lys Ala Ala Ala Pro Gln Ala Pro Trp Asp Ser
145                 150                 155                 160

Ser Thr Asn Phe Ser Ser Val Thr Val Pro Thr Leu Ile Phe Ala Cys
                165                 170                 175

Glu Asn Asp Ser Ile Ala Pro Val Asn Ser Ser Ala Leu Pro Ile Tyr
            180                 185                 190

Asp Ser Met Ser Arg Asn Ala Lys Gln Phe Leu Glu Ile Asn Gly Gly
        195                 200                 205

Ser His Ser Cys Ala Asn Ser Gly Asn Ser Asn Gln Ala Leu Ile Gly
    210                 215                 220

Lys Lys Gly Val Ala Trp Met Lys Arg Phe Met Asp Asn Asp Thr Arg
225                 230                 235                 240

Tyr Ser Thr Phe Ala Cys Glu Asn Pro Asn Ser Thr Arg Val Ser Asp
                245                 250                 255

Phe Arg Thr Ala Asn Cys Ser
            260

<210> SEQ ID NO 5
<211> LENGTH: 603
<212> TYPE: PRT
<213> ORGANISM: artificial sequence
<220> FEATURE:
<223> OTHER INFORMATION: MHET hydrolase Ideonella sp.

<400> SEQUENCE: 5
```

```
Met Gln Thr Thr Val Thr Thr Met Leu Leu Ala Ser Val Ala Leu Ala
1               5                   10                  15

Ala Cys Ala Gly Gly Gly Ser Thr Pro Leu Pro Leu Pro Gln Gln Gln
            20                  25                  30

Pro Pro Gln Gln Glu Pro Pro Pro Pro Val Pro Leu Ala Ser Arg
        35                  40                  45

Ala Ala Cys Glu Ala Leu Lys Asp Gly Asn Gly Asp Met Val Trp Pro
50                      55                  60

Asn Ala Ala Thr Val Val Glu Val Ala Ala Trp Arg Asp Ala Ala Pro
65                  70                  75                  80

Ala Thr Ala Ser Ala Ala Leu Pro Glu His Cys Glu Val Ser Gly
                85                  90                  95

Ala Ile Ala Lys Arg Thr Gly Ile Asp Gly Tyr Pro Tyr Glu Ile Lys
            100                 105                 110

Phe Arg Leu Arg Met Pro Ala Glu Trp Asn Gly Arg Phe Phe Met Glu
        115                 120                 125

Gly Gly Ser Gly Thr Asn Gly Ser Leu Ser Ala Ala Thr Gly Ser Ile
    130                 135                 140

Gly Gly Gly Gln Ile Ala Ser Ala Leu Ser Arg Asn Phe Ala Thr Ile
145                 150                 155                 160

Ala Thr Asp Gly Gly His Asp Asn Ala Val Asn Asp Asn Pro Asp Ala
                165                 170                 175

Leu Gly Thr Val Ala Phe Gly Leu Asp Pro Gln Ala Arg Leu Asp Met
            180                 185                 190

Gly Tyr Asn Ser Tyr Asp Gln Val Thr Gln Ala Gly Lys Ala Ala Val
        195                 200                 205

Ala Arg Phe Tyr Gly Arg Ala Ala Asp Lys Ser Tyr Phe Ile Gly Cys
    210                 215                 220

Ser Glu Gly Gly Arg Glu Gly Met Met Leu Ser Gln Arg Phe Pro Ser
225                 230                 235                 240

His Tyr Asp Gly Ile Val Ala Gly Ala Pro Gly Tyr Gln Leu Pro Lys
                245                 250                 255

Ala Gly Ile Ser Gly Ala Trp Thr Thr Gln Ser Leu Ala Pro Ala Ala
            260                 265                 270

Val Gly Leu Asp Ala Gln Gly Val Pro Leu Ile Asn Lys Ser Phe Ser
        275                 280                 285

Asp Ala Asp Leu His Leu Leu Ser Gln Ala Ile Leu Gly Thr Cys Asp
    290                 295                 300

Ala Leu Asp Gly Leu Ala Asp Gly Ile Val Asp Asn Tyr Arg Ala Cys
305                 310                 315                 320

Gln Ala Ala Phe Asp Pro Ala Thr Ala Ala Asn Pro Ala Asn Gly Gln
                325                 330                 335

Ala Leu Gln Cys Val Gly Ala Lys Thr Ala Asp Cys Leu Ser Pro Val
            340                 345                 350

Gln Val Thr Ala Ile Lys Arg Ala Met Ala Gly Pro Val Asn Ser Ala
        355                 360                 365

Gly Thr Pro Leu Tyr Asn Arg Trp Ala Trp Asp Ala Gly Met Ser Gly
    370                 375                 380

Leu Ser Gly Thr Thr Tyr Asn Gln Gly Trp Arg Ser Trp Trp Leu Gly
385                 390                 395                 400

Ser Phe Asn Ser Ser Ala Asn Asn Ala Gln Arg Val Ser Gly Phe Ser
                405                 410                 415

Ala Arg Ser Trp Leu Val Asp Phe Ala Thr Pro Pro Glu Pro Met Pro
```

-continued

```
                420                     425                     430
Met Thr Gln Val Ala Ala Arg Met Met Lys Phe Asp Phe Asp Ile Asp
            435                     440                     445

Pro Leu Lys Ile Trp Ala Thr Ser Gly Gln Phe Thr Gln Ser Ser Met
            450                     455                 460

Asp Trp His Gly Ala Thr Ser Thr Asp Leu Ala Ala Phe Arg Asp Arg
465                     470                     475                     480

Gly Gly Lys Met Ile Leu Tyr His Gly Met Ser Asp Ala Ala Phe Ser
                    485                     490                 495

Ala Leu Asp Thr Ala Asp Tyr Tyr Glu Arg Leu Gly Ala Ala Met Pro
                500                     505                 510

Gly Ala Ala Gly Phe Ala Arg Leu Phe Leu Val Pro Gly Met Asn His
            515                     520                 525

Cys Ser Gly Gly Pro Gly Thr Asp Arg Phe Asp Met Leu Thr Pro Leu
        530                     535                 540

Val Ala Trp Val Glu Arg Gly Glu Ala Pro Asp Gln Ile Ser Ala Trp
545                     550                     555                     560

Ser Gly Thr Pro Gly Tyr Phe Gly Val Ala Ala Arg Thr Arg Pro Leu
                    565                     570                 575

Cys Pro Tyr Pro Gln Ile Ala Arg Tyr Lys Gly Ser Gly Asp Ile Asn
                580                     585                 590

Thr Glu Ala Asn Phe Ala Cys Ala Ala Pro Pro
            595                     600
```

METHOD FOR THE ENZYMATIC DEGRADATION OF POLYETHYLENE TEREPHTHALATE

CROSS-REFERENCE TO RELATED APPLICATION

This application is the U.S. national stage application of International Patent Application No. PCT/EP2019/080253, filed Nov. 5, 2019.

The Sequence Listing for this application is labeled "Seq-List.txt" which was created on Apr. 23, 2021 and is 15 KB. The entire content of the sequence listing is incorporated herein by reference in its entirety.

TECHNICAL FIELD OF THE INVENTION

The present invention relates to a process for the enzymatic depolymerization of polyethylene terephthalate (PET), particularly contained in a plastic material. The process according to the invention can in particular be implemented on an industrial or semi-industrial scale.

BACKGROUND ART

Plastics products are durable, inexpensive materials that can be used to manufacture a wide variety of products for various applications (food packaging, clothing textiles, etc.). Consequently, the production of plastics has dramatically increased in recent decades. Most are used for short-term applications, which results in an accumulation of plastic waste and a need for its treatment. The different polymers that make up these plastics include polyethylene terephthalate (PET), an aromatic polyester produced from terephthalic acid and ethylene glycol, which is used in many applications such as food packaging (bottles, flasks, jars, trays, pouches), but also in the production of textiles for clothing, decoration (carpeting), household linen, etc.

In order to address the environmental and economic problems of waste accumulation, recycling or energy recovery technologies have been developed. The mechanical recycling process remains the most commonly used today, but it has many drawbacks. Indeed, it requires sophisticated and costly sorting to implement and leads to the production of recycled plastics of diminished quality intended for applications of lesser value (lower molecular weight, uncontrolled presence of additives). Moreover, these recycled plastics are not competitive with virgin plastics derived from oil.

Recently, innovative processes for enzymatic recycling of plastic products have been developed and described in particular in patent applications WO 2014/079844, WO 2015/097104, WO 2015/173265 and WO 2017/198786. Unlike conventional mechanical recycling processes, these enzymatic processes allow, by enzymatic depolymerization of the polymer contained in the plastic, to return to the main constituents (monomers) of the polymer. The monomers obtained can then be purified and used to repolymerize new polymers. These enzymatic processes make it possible, via the specificity of the enzymes, to avoid a costly sorting of plastics, but also to propose an infinite recycling leading to recycled polymers of equivalent quality to the polymers derived from oil. In particular, these processes make it possible to produce terephthalic acid and ethylene glycol from PET.

SUMMARY OF THE INVENTION

By working on processes for enzymatic depolymerization of PET, the Applicant has succeeded in developing an optimized process for enzymatically depolymerizing plastics containing PET at a temperature close to the Tg of this PET, in order to make the chains of said polymer more easily accessible to the depolymerization enzyme and thus increase the depolymerization rate.

To achieve such a process, the inventor had to address antinomic issues. Indeed, the enzymes capable of depolymerizing polymers are mostly more active on amorphous polymers than on semi-crystalline polymers. Although a depolymerization process at a temperature close to the Tg of a polymer can theoretically improve the accessibility of the enzyme to the chains of said polymer to be depolymerized, via an increase in the mobility of the chains of this polymer, when a polymer is subjected to a temperature close to or above its Tg, the latter tends to recrystallize more rapidly, thus making the polymer more difficult for the enzyme to depolymerize.

The inventor has thus demonstrated that it is possible to carry out a PET depolymerization process at a temperature close to or above the Tg of said PET, by ensuring on the one hand that the degree of crystallinity of the PET is sufficiently low prior to the depolymerization step and on the other hand by selecting an enzyme capable of depolymerizing this PET in a depolymerization time that is less than the time required for said PET to reach a degree of crystallinity incompatible with enzymatic depolymerization. The process developed by the inventor makes it possible to maintain depolymerization rates within a reactor compatible with industrial scale implementation. By way of example, the inventor succeeded in depolymerizing more than 90% of a PET in less than 10 h at a temperature of 72° C. Advantageously, the process of the invention can be implemented for the depolymerization and/or recycling of plastics containing PET.

The invention thus has as its object a process for the enzymatic depolymerization of polyethylene terephthalate (PET) by bringing said PET into contact with an enzyme capable of depolymerizing said PET, characterized in that the PET has an initial degree of crystallinity of at most 25%, the depolymerization step is carried out at a temperature T equal to the Tg±10° C. of said PET, and the enzyme is selected such that a depolymerization time (tD) of the PET by said enzyme is strictly less than a crystallization time (tR) of said PET, wherein the time tD represents the time required for said enzyme to depolymerize at least 80% of said PET at said temperature T, and the time tR represents the time required for said PET to reach a degree of crystallinity of at most 35% at said temperature T.

The depolymerization step is preferentially carried out at a temperature T comprised between 66° C. and 80° C., preferentially between 68° C. and 73° C., the time tD being less than or equal to 20 h, preferentially less than 16 h.

DESCRIPTION OF THE FIGURE

FIG. 1: Recrystallization kinetics of a PET contained in a plastic material during the incubation of said material at different temperatures.

DETAILED DESCRIPTION OF THE INVENTION

Definitions

In the context of the invention the expression "plastic material" refers to plastic products (such as sheets, trays, films, tubes, blocks, fibers, fabrics, etc.) and to the plastic compositions used to make the plastic products. Preferentially, the plastic material is composed of amorphous and/or semi-crystalline polymers. The plastic material may contain, in addition to the polymer(s), additional substances or additives, such as plasticizers, mineral or organic fillers, dyes, etc. Thus, in the context of the invention, plastic material refers to any plastic product and/or plastic composition comprising at least one polymer in semi-crystalline and/or amorphous form and more particularly at least one PET.

Plastic products include manufactured plastic products, such as rigid or flexible packaging (films, bottles, trays), agricultural films, bags, disposable objects, textiles, fabrics, non-wovens, floor coverings, plastic waste or fiber waste, etc.

The term "polymer" refers to a chemical compound whose structure consists of multiple repeating units (i.e., "monomers") linked by chemical covalent bonds. In the context of the invention, the term "polymer" refers more specifically to such chemical compounds used in the composition of plastic materials.

The term "polyester" refers to a polymer that contains an ester functional group in the main chain of its structure. The ester functional group is characterized by a bond between a carbon and three other atoms: a single bond with another carbon atom, a double bond with an oxygen and a single bond with another oxygen atom. The oxygen bonded to the carbon by a single bond is itself bonded to another carbon by a single bond. Polyesters can be made of only one type of monomer (i.e., homopolymer) or of at least two different monomers (i.e., copolymer). The polyesters can be aromatic, aliphatic or semi-aromatic. By way of example, polyethylene terephthalate is a semi-aromatic copolymer composed of two monomers, terephthalic acid and ethylene glycol.

In the context of the invention, the term "semi-crystalline polymers" refers to partially crystalline polymers, in which crystalline and amorphous regions coexist. The degree of crystallinity of a semi-crystalline polymer can be estimated by various analytical methods and is generally comprised between 10% and 90%. A polymer with a degree of crystallinity of less than 10% can be considered amorphous.

A "depolymerization process" in relation to a polymer or plastic material refers to a process in which a polymer or at least one polymer of a plastic material is degraded to smaller molecules, such as monomers and/or oligomers. In the case of the present invention, a process for depolymerizing PET or a plastic material containing PET refers to a process in which PET is degraded to monomers such as terephthalic acid and/or ethylene glycol and/or oligomers such as dimethyl terephthalate (DMT), methyl-2-hydroxyethyl terephthalate (MHET), bis(2-hydroxyethyl) terephthalate (BHET).

PET Selection

The depolymerization process according to the invention is based on enzymatic depolymerization of a PET, by bringing said PET into contact with at least one enzyme capable of depolymerizing it. More particularly, the inventor has developed a process for the enzymatic depolymerization of PET comprising a depolymerization step carried out at a temperature T comprised between the Tg−10° C. and the Tg+10° C. of said PET, starting from a PET having an initial degree of crystallinity of at most 25%. Also, according to a particular embodiment of the invention, the PET is selected such that the latter has an initial degree of crystallinity of at most 25%.

According to the invention, the PET subjected to the depolymerization step is an amorphous and/or semi-crystalline PET at the start of the depolymerization step, the initial degree of crystallinity of which is less than or equal to 25%. "Initial degree of crystallinity" means the degree of crystallinity of the PET at the start of the depolymerization step, i.e., before said PET is brought into contact with a depolymerization enzyme. Thus, in the case where the PET undergoes one or more pre-treatment steps (amorphization, micronization), the "initial degree of crystallinity" corresponds to the degree of crystallinity after these pre-treatment steps.

The degree of crystallinity of a semi-crystalline polymer can be estimated by various analytical methods, and is generally comprised between 10% and 90%. For example, differential scanning calorimetry (DSC) or X-ray diffraction can be used to determine the degree of crystallinity of polymers. Other techniques are also suitable for determining the crystallinity of polymers, but with less reliability, such as small-angle X-ray scattering (SAXS) or wide-angle X-ray scattering (WAXS) and infrared spectroscopy. In the present application, crystallinity is measured by differential scanning calorimetry (DSC). More particularly, the DSC experiments were conducted using the following protocol: a small amount of plastic material (several mg) is heated at a constant heating rate from room temperature or from a temperature below room temperature to a temperature above the melting temperature (Tm) of the polymer. Heat flux data are collected and plotted as a function of temperature. The degree of crystallinity (Xc) expressed as a percentage (%) is calculated according to the following formula:

$$Xc(\%) = \frac{(\Delta Hf - \Delta Hcc)}{wt * \Delta Hf 100\%} \times 100\%$$

On the understanding that:
ΔHf is the enthalpy of fusion which can be determined by integrating the endothermic melting peak,
ΔHcc is the cold crystallization enthalpy and determined by integrating the exothermic cold crystallization peak,
wt represents the weight fraction of polyester in the plastic, and
ΔHf100% corresponds to the enthalpy of fusion for a fully crystalline polymer and can be found in the literature. For example, ΔHf100% of PET corresponds in the literature to 125.5 J/g (Polymer Data Handbook, second edition, edited by James E. Mark, OXFORD, 2009).

The margin of error in measuring the degree of crystallinity is about 10%. Thus, a degree of crystallinity assessed at 25% corresponds to a degree of crystallinity comprised between 22.5% and 27.5%.

According to an embodiment of the process, a PET is selected that has a degree of crystallinity of less than 25%±10%. In a preferred embodiment, the PET has an initial degree of crystallinity of less than 20%±10%. In another preferred embodiment, the PET subjected to the depolymerization step is an amorphous PET, i.e., having a degree of crystallinity less than 10%±10%.

According to the invention, it is possible to carry out a PET amorphization step upstream of the depolymerization step, by any means known to the person skilled in the art, so as to achieve an initial degree of crystallinity of less than or equal to 25%. Such an amorphization step is described in particular in the application WO 2017/198786.

In a particular embodiment, the depolymerization process according to the invention is carried out with a plastic material comprising at least PET. In a preferred embodiment, PET represents at least 80% by weight of said plastic material, preferentially at least 85%, 90%, 95%.

In a particular context of the invention, the term "plastic material" refers to any plastic product in the form of fibers, such as textiles, fabrics, nonwovens, yarns etc. Thus, in a particular embodiment, the plastic material is selected from fibers and/or fiber and/or textile wastes and PET represents at least 60% by weight based on the total weight of said plastic material, preferentially at least 65%, 70%, 75%, 80%, 85%, 90%, 95%.

In a particular embodiment, the plastic material comprises a mixture of PET and polylactic acid (PLA), a mixture of PET and polyethylene (PE), a mixture of PET and polytrimethylene terephthalate (PTT), a mixture of PET and polyamide (PA), or a mixture of PET and cotton. Advantageously, the plastic materials used in the reactor are plastic waste or fiber waste. This waste can come from the collection channels intended for recycling, but can also be waste from the production channel or the recycling channel, and can thus contain other compounds than plastic waste. This implies that PET can be used in the reactor in combination with other elements present in these flows (such as paper, cardboard, aluminum, glue, etc.). In a particular embodiment, the reactor in which the depolymerization step is carried out is loaded with several plastic materials containing at least PET, preferentially containing at least 80% by weight of PET, based on the total weight of plastic materials, preferentially at least 85%, 90%, 95%.

According to the invention, the PET is characterized by its initial glass transition temperature (Tg), i.e., before said PET is brought into contact with a depolymerization enzyme. Thus, in the case where the PET undergoes a pre-treatment step (amorphization, micronization), the PET is characterized by its Tg after these pre-treatment steps. This temperature can be estimated by different analytical methods. For example, differential scanning calorimetry (DSC) or differential thermal analysis (DTA) can be used to determine the Tg of a polymer. In the present description, Tg corresponds to the glass transition temperature measured by DSC during the first temperature scan as indicated in the examples. In general, the margin of error in measuring Tg is about 2° C.

In a particular embodiment of the invention, the initial Tg of the PET is comprised between 60° C. and 90° C., preferentially between 60° C. and 85° C. In another particular embodiment, the initial Tg of the PET is comprised between 65° C.±1° C. and 80° C.±1° C. In another particular embodiment, the initial Tg of the PET is comprised between 65° C.±2° C. and 80° C.±2° C. In another particular embodiment, the initial Tg of the PET is comprised between 60° C.±2° C. and 70° C.±2° C.

According to the invention, it is possible to carry out a PET pre-treatment step upstream of the depolymerization step, and in particular a step of grinding the PET, or the plastic material containing the PET, before the polyester depolymerization step. In a preferred embodiment, the PET or the plastic material containing the PET is reduced to powder form by any suitable means known to the skilled person. In this particular case, the PET, or the plastic material containing the PET, is advantageously micronized so as to be converted to powder form.

In a particular embodiment, the PET or the plastic material containing the PET introduced into the reactor is in the form of a powder with an average particle size (d50) of less than 2 mm, preferentially with a particle size less than 1 mm. In another embodiment, the PET or the plastic material containing the PET used in the reactor is in the form of a powder with an average particle size (d50) of less than 500 μm.

In a particular embodiment, the depolymerization process comprises a step of amorphizing the PET, followed by a step of grinding and/or micronizing the PET or the plastic material containing the PET prior to the PET depolymerization step.

In a particular embodiment, the depolymerization process comprises a step of amorphizing the PET prior to the step of depolymerizing the PET and, the PET or the plastic material containing the PET is engaged in the reactor in the form of granules from the extruder used for amorphization. Thus, the PET or the plastic material containing the PET is engaged in the form of granules smaller than 2 mm, preferentially smaller than 1 mm.

Enzyme Selection

According to the invention, the depolymerization process is carried out with an enzyme capable of depolymerizing PET. More particularly, the enzyme is selected such that a depolymerization time (tD) of the PET by said enzyme is strictly less than a crystallization time (tR) of said PET.

According to the invention, the crystallization time "(tR)" of PET is defined as the time required for said PET of initial crystallinity Xc to reach a rate, or a degree of crystallinity of 35% or less than 35% at a temperature T. This time is dependent on the nature of the material and/or the nature of the polymer (i.e., the presence of additives and/or co-monomers), its molecular weight, its Tg and also its thermal history (prior treatments involving cooling and/or heating, such as amorphization or micronization). This time is measured under conditions where the temperature T is regulated, and is not impacted by stirring and/or pH during measurement. According to the invention, it is possible to measure the crystallization time (tR) of PET at a temperature T by incubating the plastic material containing PET at this temperature T, and by regularly measuring the degree of crystallinity (by DSC) of samples taken at different time intervals.

According to the invention, the depolymerization time "(tD)" represents the time required for the polymer-degrading enzyme to depolymerize at least 80% of said polymer at a temperature T. In a particular embodiment, this time is determined at the optimum pH of the enzyme and at a saturating enzyme concentration, i.e., a concentration above which the reaction rate is not improved by the addition of enzyme. Thus, the time tD corresponds to the time required for the enzyme to release 80% of the monomers present in the polymer. In the particular case of the invention, the time tD corresponds to the time required to obtain, after bringing the enzyme and the PET into contact, 80% of the terephthalic acid (TA) equivalent present in the PET, the TA equivalent corresponding to the free TA and the TA present in the BHET and MHET oligomers. In another particular case of the invention, the time tD corresponds to the time required to obtain, after bringing the enzyme and the PET into contact, 80% of the monoethylene glycol (MEG) equivalent in the PET, the MEG equivalent corresponding to the free MEG and the MEG present in the BHET and MHET oligomers.

It is specified that the measurement of the times tD and tR is carried out at the same temperature T.

According to the invention, the enzyme is advantageously selected from enzymes having a melting temperature (Tm) strictly higher than the temperature T at which the depolymerization step is carried out.

In the context of the invention, the temperature Tm corresponds more particularly to the temperature at which half the amount of the enzyme under consideration is unfolded or misfolded, so that it loses all or part of its activity compared with the activity of the correctly folded enzyme. In particular, the Tm makes it possible to estimate the thermostability of the enzyme under consideration. The Tm can be measured by any means known to the skilled person, in particular differential scanning fluorimetry (DSF). Alternatively, Tm can be assessed by protein folding analysis using the circular dichroism method. Preferably, Tm is measured using DSF as described in the experimental section.

In a preferred embodiment, the enzyme is selected from enzymes having a Tm greater than or equal to T+10° C., preferentially greater than or equal to T+15° C., more preferentially greater than or equal to T+20°.

The depolymerization activity of an enzyme on a polymer can be assessed by any means known to the skilled person. For example, it can be assessed by the loss of mass of the polymer or the measurement of the depolymerization rate of the polymer, i.e., the amount of monomers and/or oligomers produced over a period of time. Thus, in the context of the invention, the depolymerization activity of a PET-degrading enzyme can be assessed by measuring the amounts of oligomers (BHET and/or MHET) and/or of monomers (terephthalic acid and/or ethylene glycol and/or DMT) released under particular temperature and pH conditions and by bringing the PET or PET-containing plastic material into contact with said enzyme. The depolymerization activity can also be assessed by monitoring the addition of base during the depolymerization reaction. An addition of base is indeed performed in order to neutralize the terephthalic acid produced by the depolymerization and thus regulate the pH. Also, the amount of base added during the reaction makes it possible to measure the amount of terephthalic acid produced during the reaction. Preferentially, a basic solution is added so as to maintain the reaction medium at the optimum pH of the enzyme.

Advantageously, said enzyme is selected from cutinases, lipases and esterases degrading said PET. Particularly, said enzyme is selected from esterases degrading said PET.

For example, the enzyme may be selected from cutinases derived from *Thermobifida cellulosityca, Thermobifida halotolerans, Thermobifida fusca, Thermobifida alba, Bacillus subtilis, Fusarium solani pisi, Humicola insolens* (such as the one under entry A0A075B5G4 in the UniProt database), *Sirococcus conigenus, Pseudomonas mendocina* and *Thielavia terrestris*, or a variant thereof.

In another case, the cutinase is selected from cutinases from metagenomic libraries such as the LC-Cutinase described in Sulaiman et al., 2012 or variants thereof.

In another case, the enzyme is a lipase, preferably derived from *Ideonella sakaiensis*. Alternatively, the enzyme can be selected from commercial enzymes such as Novozym 51032 or variants of these enzymes.

It is of course possible to load the reactor with several enzymes, and in particular at least two of the abovementioned enzymes.

In a particular case, the enzyme (or the enzymes) is selected from enzymes having an amino acid sequence with at least 75% identity with SEQ ID NO: 1 and/or SEQ ID NO: 2 and/or SEQ ID NO: 3 and/or SEQ ID NO: 4 and/or SEQ ID NO: 5, and having PET depolymerizing activity. In a particular case, the enzyme is selected from enzymes having an amino acid sequence having at least 75% identity with SEQ ID NO: 1, and PET depolymerization activity.

In a particular embodiment the enzyme is capable of depolymerizing the polymer to oligomers, in which case it is advantageously associated with an enzyme capable of depolymerizing said oligomers to monomers. In a particular example, the two enzymes are then selected from the enzymes having an amino acid sequence having at least 75% identity with SEQ ID NO: 4 and/or SEQ ID NO: 5.

The inventor has identified that the process of the invention is particularly suitable in the particular case where the selected enzyme has an amino acid sequence having at least 90% identity with SEQ ID NO: 1 and comprising at least one mutation combination selected from F208I+D203C+S248C+Y92G, F208W+D203C+S248C+Y92G or F208I+D203C+S248C+V170I+Y92G relative to SEQ ID NO: 1.

Advantageously, the time tD is less than or equal to 20 h, preferentially less than or equal to 18 h, 16 h, 14 h, 12 h, 10 h. In an embodiment, the time tD is comprised between 1 h and 16 h, preferentially between 1 h and 10 h. Conversely, the crystallization time tR is preferentially greater than or equal to 20 h, preferentially greater than or equal to 18 h, 16 h, 14 h, 12 h, 10 h.

In a particular embodiment, the time tR corresponds to the time necessary for said PET, having an initial crystallinity of less than or equal to 25%, to reach a crystallinity of 30%, or less than 30%, at said temperature T.

Thus, in a particular embodiment, the polyethylene terephthalate (PET) enzymatic depolymerization process according to the invention is characterized in that
  the PET has an initial degree of crystallinity of at most 25%;
  the depolymerization step is carried out at a temperature T equal to the Tg±10° C. of said PET, and
  the enzyme is selected such that a depolymerization time (tD) of the PET by said enzyme is strictly less than a crystallization time (tR) of said PET, wherein the time tD represents the time required for the selected enzyme to depolymerize at least 80% of said PET at said temperature T, and the time tR represents the time required for said PET to reach a degree of crystallinity of 30%, or less than 30%, at said temperature T.

Advantageously, the enzyme is selected from the enzymes having a Tm greater than or equal to the temperature T+10° C., preferentially greater than or equal to the temperature T+15° C., more preferentially greater than or equal to the temperature T+20°.

Thus, in a particular embodiment, the polyethylene terephthalate (PET) enzymatic depolymerization process according to the invention is characterized in that
  a PET with an initial degree of crystallinity of at most 25% is selected;
  an enzyme capable of degrading PET is selected, such that a depolymerization time (tD) of the PET by said enzyme is strictly less than a crystallization time (tR) of said PET, wherein the time tD represents the time required for the selected enzyme to depolymerize at least 80% of said PET at said temperature T, and the time tR represents the time required for said PET to reach a degree of crystallinity of 30%, or less than 30%, at said temperature T; and
  an enzymatic depolymerization step of said PET is carried out by bringing said PET into contact with said enzyme at a temperature T equal to the Tg±10° C. of said PET.

Advantageously, the enzyme is selected from the enzymes having a Tm greater than or equal to the temperature T+10° C., preferentially greater than or equal to the temperature T+15° C., more preferentially greater than or equal to the temperature T+20°.

In a preferred embodiment, the time tD corresponds to the time required for said enzyme to depolymerize at least 85% of said PET at said temperature T, preferentially at least 90%.

Thus, in a preferred embodiment, the polyethylene terephthalate (PET) enzymatic depolymerization process according to the invention is characterized in that
- the PET has an initial degree of crystallinity of at most 25%;
- the depolymerization step is carried out at a temperature T equal to the Tg±10° C. of said PET, and
- the enzyme is selected such that a depolymerization time (tD) of the PET by said enzyme is strictly less than a crystallization time (tR) of said PET, wherein the time tD represents the time required for the selected enzyme to depolymerize at least 85% of said PET at said temperature T, preferentially at least 90%, and the time tR represents the time required for said PET to reach a degree of crystallinity of at most 35%, preferentially at most 30% at said temperature T.

Advantageously, the enzyme is selected from the enzymes having a Tm greater than or equal to the temperature T+10° C., preferentially greater than or equal to the temperature T+15° C., more preferentially greater than or equal to the temperature T+20°.

In a preferred embodiment, the polyethylene terephthalate (PET) enzymatic depolymerization process according to the invention is characterized in that
- a PET with an initial degree of crystallinity of at most 25% is selected;
- an enzyme capable of depolymerizing PET is selected such that a depolymerization time (tD) of the PET by said enzyme is strictly less than a crystallization time (tR) of said PET, wherein the time tD represents the time required for the selected enzyme to depolymerize at least 85% of said PET at said temperature T preferentially at least 90%, and the time tR represents the time required for said PET to reach a degree of crystallinity of at most 35%, preferentially a degree of crystallinity of at most 30% at said temperature T; and
- a step of depolymerizing said PET is carried out by bringing said enzyme into contact with said PET at a temperature T equal to the Tg±10° C. of said PET.

Advantageously, the enzyme is selected from the enzymes having a Tm greater than or equal to the temperature T+10° C., preferentially greater than or equal to the temperature T+15° C., more preferentially greater than or equal to the temperature T+20°.

More generally, the PET enzymatic depolymerization process according to the invention comprises the steps according to which:
- a PET with an initial degree of crystallinity of at most 25% is selected;
- an enzyme capable of degrading PET is selected such that a depolymerization time (tD) of the PET by said enzyme is strictly less than a crystallization time (tR) of said PET, wherein the time tD represents the time required for said enzyme to depolymerize at least 80% of said PET at said temperature T, and the time tR represents the time required for said PET to reach a degree of crystallinity of 35%, or less than 35%, at said temperature T
- the depolymerization step is carried out by bringing the enzyme into contact with the PET, at a temperature T equal to the Tg±10° C. of said PET.

Depolymerization Step

The depolymerization step according to the invention is advantageously implemented in a reactor whose volume is greater than 500 milliliters (mL), greater than 1 liter (L), preferentially greater than 2 L, 5 L, 10 L. In a particular embodiment, the process of the invention can be implemented on an industrial and/or semi-industrial scale. Thus, it is possible to use a reactor whose volume is greater than 100 L, 150 L, 1000 L, 10 000 L, 100 000 L, 400 000 L.

According to the invention, it is possible to load the reactor intended for carrying out the depolymerization step directly with PET, or with plastic materials containing at least PET.

According to the invention, the amount of enzyme engaged during the depolymerization step is advantageously sufficient to allow a total or quasi-total depolymerization of said PET (i.e., degradation up to at least 80% by weight based on the weight of said engaged PET) in reaction times compatible with an industrial-scale implementation.

In an embodiment, the ratio by weight of amount of engaged enzyme to amount of engaged PET is comprised between 0.01:1000 and 3:1000. Preferentially the ratio of the amount of engaged enzyme to the amount of engaged PET is comprised between 0.5:1000 and 2.5:1000, more preferentially between 1:1000 and 2:1000. In a particular case, the amount of engaged enzyme is greater than or equal to the amount of enzyme required to achieve a saturating concentration of enzyme. In a particular case, the enzyme may be engaged in the form of a composition comprising in addition to the enzyme excipients, which may be selected from buffers commonly used in biochemistry, preservatives, and/or stabilizing agents. The amount of enzyme then advantageously refers to the amount of enzyme free of any excipient.

According to the invention, the PET depolymerization step is carried out at a temperature T equal to the Tg±10° C. of said PET, the Tg being that of said PET before the depolymerization step. Advantageously, the temperature is maintained below the inactivation temperature of the enzyme. In a particular embodiment, the PET depolymerization step is carried out at a temperature T comprised between the Tg−10° C. and the Tg+5° C. of the PET. In another particular embodiment, the depolymerization step is carried out at a temperature T comprised between the Tg−8° C. and the Tg+2° C. of the PET. In another particular embodiment, the depolymerization step is carried out at a temperature T comprised between the Tg−10° C. and the Tg−5° C. of the PET.

In a particular embodiment, the PET has a Tg of 78° C.±2° C. and the depolymerization step is carried out at a temperature T equal to 70° C.±2° C. In another particular embodiment, the PET has a Tg of 78° C.±2° C. and the depolymerization step is carried out at a temperature T equal to 72° C.±2° C. In another particular embodiment, the PET has a Tg of 75° C.±2° C. and the depolymerization step is carried out at a temperature T equal to 68° C.±2° C. In another particular embodiment, the PET has a Tg of 75° C.±2° C. and the depolymerization step is carried out at a temperature T equal to 70° C.±2° C. In another particular embodiment, the PET has a Tg of between 70° C.±2° C. and 75° C.±2° C. and the depolymerization step is carried out at a temperature T comprised between 65° C.±2° C. and 72° C.±2° C.

In a particular embodiment, the PET is derived from a plastic material selected from fibers and/or fiber and/or textile wastes and has a Tg comprised between 60° C.±1° C. and 75° C.±1° C., and the depolymerization step is carried out at a temperature T equal to 65° C.±2° C. In another particular embodiment, the PET is derived from a plastic material selected from fibers and/or fiber and/or textile wastes and has a Tg comprised between 60° C.±1° C. and 70° C.±1° C. and the depolymerization step is carried out at a temperature T equal to 60° C.±2° C.

In a particular embodiment, the depolymerization step is carried out at a temperature T comprised between 66° C. and 80° C., preferentially between 68° C. and 73° C. In a particular embodiment, the depolymerization step is carried out at a temperature T of 72° C.±1° C. In another particular embodiment, the depolymerization step is carried out at a temperature T of 70° C.±1° C.

Thus, in a particular embodiment, the polyethylene terephthalate (PET) enzymatic depolymerization process according to the invention is characterized in that
- the PET has an initial degree of crystallinity of at most 25% and a Tg comprised between 65° C.±1° C. and 80° C.±1° C.;
- the depolymerization step is carried out at a temperature T comprised between 66° C. and 80° C., preferentially between 68° C. and 73° C., and
- the enzyme is selected such that a depolymerization time (tD) of the PET by said enzyme is strictly less than a crystallization time (tR) of said PET, wherein the time tD represents the time required for the selected enzyme to depolymerize at least 80% of said PET at said temperature T, and the time tR represents the time required for said PET to reach a degree of crystallinity of 35%, or less than 35%, at said temperature T.

Advantageously, a PET is selected having an initial degree of crystallinity of at most 25%, preferentially at most 20%. In a particular embodiment, a PET is selected having an initial degree of crystallinity of at most 25% and a Tg comprised between 65° C.±1° C. and 80° C.±1° C.

In another particular embodiment, the polyethylene terephthalate (PET) enzymatic depolymerization process according to the invention is characterized in that
- the PET has an initial degree of crystallinity of at most 25% and a Tg comprised between 65° C.±1° C. and 80° C.±1° C.;
- the depolymerization step is carried out at a temperature T of 72° C.±1° C., and
- the enzyme is selected such that a depolymerization time (tD) of the PET by said enzyme is strictly less than a crystallization time (tR) of said PET, wherein the time tD represents the time required for the selected enzyme to depolymerize at least 80%, preferentially at least 85%, more preferentially at least 90% of said PET at said temperature T, and the time tR represents the time required for said PET to reach a degree of crystallinity of at most 35% at said temperature T.

Preferentially, tR represents the time required for said PET to reach a degree of crystallinity of at most 30% at said temperature T.

Advantageously, the enzyme is selected from the enzymes having a Tm greater than or equal to the temperature T+10° C., preferentially greater than or equal to the temperature T+15° C., more preferentially greater than or equal to the temperature T+20°.

In another particular embodiment, the polyethylene terephthalate (PET) enzymatic depolymerization process according to the invention is characterized in that
- a PET with an initial degree of crystallinity of at most 25% and a Tg comprised between 75° C.±1° C. and 80° C.±1° C. is selected;
- the depolymerization step is carried out at a temperature T of 72° C.±1° C., and
- the enzyme is selected such that a depolymerization time (tD) of the PET by said enzyme is strictly less than a crystallization time (tR) of said PET, wherein the time tD represents the time required for the selected enzyme to depolymerize at least 80%, preferentially at least 85%, more preferentially at least 90% of said PET at said temperature T, and the time tR represents the time required for said PET to reach a degree of crystallinity of at most 35% at said temperature T. Preferentially, tR represents the time required for said PET to reach a degree of crystallinity of at most 30% at said temperature T.

Advantageously, the enzyme is selected from the enzymes having a Tm greater than or equal to the temperature T+10° C., preferentially greater than or equal to the temperature T+15° C., more preferentially greater than or equal to the temperature T+20°.

In another particular embodiment, the polyethylene terephthalate (PET) enzymatic depolymerization process according to the invention is characterized in that
- the PET has an initial degree of crystallinity of at most 25% and a Tg comprised between 65° C.±1° C. and 80° C.±1° C.;
- the depolymerization step is carried out at a temperature T of 70° C.±1° C., and
- the enzyme is selected such that a depolymerization time (tD) of the PET by said enzyme is strictly less than a crystallization time (tR) of said PET, wherein the time tD represents the time required for the selected enzyme to depolymerize at least 80%, preferentially at least 85%, more preferentially at least 90% of said PET at said temperature T, and the time tR represents the time required for said PET to reach a degree of crystallinity of at most 35% at said temperature T. Preferentially, tR represents the time required for said PET to reach a degree of crystallinity of at most 30% at said temperature T. Advantageously, the enzyme is selected from enzymes having a Tm greater than or equal to the temperature T+10° C., preferentially greater than or equal to the temperature T+15° C., more preferentially greater than or equal to the temperature T+20°.

Thus, advantageously, in this embodiment, a PET with an initial degree of crystallinity of at most 25% and a Tg comprised between 65° C.±1° C. and 80° C.±1° C. is selected and the depolymerization step is carried out at a temperature T of 70° C.±1° C.

In another particular embodiment, the polyethylene terephthalate (PET) enzymatic depolymerization process according to the invention is characterized in that
- a plastic material is selected from fibers and/or fiber and/or textile waste comprising PET with an initial degree of crystallinity of at most 25% and a Tg comprised between 60° C.±1° C. and 75° C.±1° C.;
- an enzyme capable of degrading PET is selected such that a depolymerization time (tD) of the PET by said enzyme is strictly less than a crystallization time (tR) of said PET, wherein the time tD represents the time required for the selected enzyme to depolymerize at least 80%, preferentially at least 85%, more preferentially at least 90% of said PET at said temperature T, and the time tR represents the time required for said PET to reach a degree of crystallinity of at most 35% at said temperature T, and
- the PET depolymerization step is carried out by bringing said enzyme into contact with said plastic material at a temperature T of 65° C.±1° C.

Preferentially, tR represents the time required for said PET to reach a degree of crystallinity of 30% at said temperature T. Advantageously, the enzyme is selected from enzymes having a Tm greater than or equal to the temperature T+10° C., preferentially greater than or equal to the temperature T+15° C., more preferentially greater than or equal to the temperature T+20°.

In another particular embodiment, the polyethylene terephthalate (PET) enzymatic depolymerization process according to the invention is characterized in that
- a plastic material is selected from fibers and/or fiber and/or textile waste comprising PET with an initial degree of crystallinity of at most 25% and a Tg comprised between 60° C.±1° C. and 70° C.±1° C.;
- an enzyme capable of degrading PET is selected such that a depolymerization time (tD) of the PET by said enzyme is strictly less than a crystallization time (tR) of said PET, wherein the time tD represents the time required for the selected enzyme to depolymerize at least 80%, preferentially at least 85%, more preferentially at least 90% of said PET at said temperature T, and the time tR represents the time required for said PET to reach a degree of crystallinity of at most 35% at said temperature T, and
- the PET depolymerization step is carried out by bringing said enzyme into contact with said plastic material at a temperature T of 60° C.±1° C.

Preferentially, tR represents the time required for said PET to reach a degree of crystallinity of at most 30% at said temperature T. Advantageously, the enzyme is selected from enzymes having a Tm greater than or equal to the temperature T+10° C., preferentially greater than or equal to the temperature T+15° C., more preferentially greater than or equal to the temperature T+20°.

In a particular embodiment, the crystallization time (tR) of the PET is measured prior to the depolymerization step, on a sample of said PET.

According to the invention, the enzyme is selected such that the depolymerization time (tD) of PET by said enzyme is strictly less than the crystallization time (tR) of said PET. Preferentially, the enzyme is selected such that the time tD corresponds to the time required for said enzyme to depolymerize at least 90% of said PET at said temperature T, and that the time tR corresponds to the time required for said PET to reach a degree of crystallinity of at most 30% at said temperature T. In a particular embodiment, the time tD is less than 20 h, preferentially less than 18 h, 16 h, 14 h, 12 h, 10 h. In another particular embodiment, the time tD is comprised between 1 h and 16 h, preferentially between 1 h and 10 h.

According to the invention, the PET depolymerization step is performed by bringing said PET and said selected enzyme into contact at a temperature T.

Advantageously, the pH is regulated to optimize the yield of the depolymerization process as a function of the solubility of the monomers/oligomers. In a particular embodiment, the pH is regulated to be maintained at the optimal pH of the enzyme±1. Particularly, the pH is thus regulated to be maintained between 6.5 and 9. In a particular embodiment, the pH is regulated to between 6.5 and 8.5 during the depolymerization step, preferentially between 7 and 8. In another particular embodiment, the pH is regulated between 7.5 and 8.5.

According to the invention, the contents of the reactor are maintained under stirring during the depolymerization step. The stirring speed is regulated by the person skilled in the art to be sufficient to allow suspension of the plastic/polyester material engaged in the reactor, temperature homogeneity, and precision of pH regulation. For example, the stirring speed is maintained between 50 rpm and 500 rpm, in particular at 80 rpm, 100 rpm, 150 rpm, 200 rpm, 250 rpm, 300 rpm, 350 rpm, 400 rpm, 450 rpm, 500 rpm.

EXAMPLES

Example 1: Measurement of PET Crystallization Time (tR)

1.1 Amorphization of PET from Plastic Material

The depolymerization process is carried out using colored and washed plastic flakes derived from the PET waste recycling industry. These plastic materials, composed of 98% m/m (by weight) of PET with an average degree of crystallinity of 34%, underwent an extrusion step, followed by a rapid cooling allowing the amorphization of the PET contained in the waste. The extruder used for amorphization was a KMB ZE 60A twin-screw extruder equipped with a gear pump, filter changer, die and overhead water cutting system. The regulated temperature was 265° C. in the extruder zones, 280° C. in the gear pump, 280° C. in the filter changer zones and 360° C. in the die. The water used in the granulation system was regulated to a temperature of 80° C. To introduce the flakes, a gravimetric dosing system marketed by Brabender was used. A flow rate of 150 kg/h was used. For granulation, a die comprising 120 holes of 0.8 mm diameter was used. The cutting speed was 4500 rpm. The amorphization resulted in granules smaller than 1 mm in size and the degree of crystallinity was measured at 16% (by DSC). The granules then underwent a powder reduction step using a disc pulverizer. The powder was subjected to a 400 μm sieve to recover only the smaller powders. The degree of crystallinity of this powder was determined to be 16% in accordance with Example 1.2 below.

1.2 Measurement of Tg and Degree of Crystallinity of PET

For the DSC analysis, a Mettler Toledo DSC 3 apparatus was used with a dry air flow. Only the first temperature scan was performed to determine the thermal characteristics of the PET powder, using a powder sample from Example 1.1, in particular the glass transition temperature (Tg) and the initial degree of crystallinity. The temperature increase was carried out from 25° C. to 280° C. with a heating rate of 10° C./min with about 10 mg of sample using a 40 μL aluminum crucible.

The Tg was determined, using Mettler Toledo STARe software, at the midpoint of the glass transition shown on the sample thermogram, and the initial degree of crystallinity in accordance with the equation detailed in the description.

The Tg of the PET powder produced in Example 1.1 was assessed at 78.4° C.

1.3 Measurement of the Crystallization Kinetics of the PET of the Plastic Material 5 g of powder from Example 1.1 (plastic materials containing PET) and 20 ml of water were mixed in a 40 ml bottle. The closed bottle was then immersed in a water bath set at the desired incubation temperature T. Samples at different time intervals were taken. The collected powder was deposited on absorbent paper for air drying for at least 12 h. DSC analysis was then performed on roughly 10 mg of sample to assess the degree of crystallinity as indicated in Example 1.2.

FIG. 1 shows the change in PET crystallinity as a function of time, at different temperatures: 65° C., 70° C., 72° C., 75° C.

At 65° C. the crystallinity of the PET in the powder of Example 1.1 changes very little and, after 72 h at 65° C. the crystallinity remains below 20% (data not shown). This will also be the case for temperatures below 65° C.

At 70° C., 72° C. and 75° C., the PET reaches 35% crystallinity after 17.5 h, 11.5 h and 5 h, respectively. At 70°

C., 72° C. and 75° C., the PET reaches 30% crystallinity after 16 h, 10 h and 4.3 h, respectively.

Example 2: Evaluation of Melting Temperatures (Tm) of Enzymes

2.1 Enzyme Production

Genes were expressed in competent *E. coli* BL21 (DE3) cells (New England Biolabs, Ipswich, MA) by culturing in ZYM self-inducible medium (Studier et al., 2005—Prot. Exp. Pur. 41, 207-234) for 23 hours at 21° C. *E. coli* cells were harvested by centrifugation (6000×g, 10 min at 4° C.) and suspended in lysis buffer (20 mM Tris-HCl, pH 8, 300 mM NaCl). The cells were broken up by sonication on ice and the lysate was clarified by centrifugation (10 000×g, 30 min at 4° C.). The soluble fraction was subjected to a TALON metal affinity resin (Clontech, CA). After washing the unbound proteins with lysis buffer supplemented with 10 mM imidazole, the bound proteins were eluted with elution buffer (20 mM Tris-HCl, pH 8, 300 mM NaCl, 100 mM imidazole). The buffer was finally exchanged for a storage buffer (20 mM Tris-HCl, pH 8, 300 mM NaCl) by dialysis. The concentration of purified protein was determined based on the molar extinction coefficient calculated at 280 nm.

2.2 Assessment of Tm

DSF was used to evaluate the melting temperatures (Tm) of the enzymes used.

Protein samples were prepared at a concentration of 14 µM (0.4 mg/mL) and stored in a buffer consisting of 20 mM Tris HCl, pH 8.0, 300 mM NaCl. SYPRO Orange Dye 5000×DMSO stock solution was first diluted 250-fold in water. Protein samples were loaded onto a 96-well PCR plate (Lifescience Bio-Rad, France, cat #HSP9601), each well containing a final volume of 25 µL. The final concentration of protein and SYPRO Orange dye in each well was 5 µM (0.14 mg/ml) and 10×, respectively. The volumes loaded per well were 15 µL of buffer, 9 µL of the 0.4 mg/mL protein solution, and 1 µL of the diluted 250×SYPRO Orange solution. PCR plates were then sealed with optical grade adhesive tape and centrifuged at 2000 rpm for 1 min at room temperature. DSF experiments were then performed using a Bio-Rad CFX96 real-time PCR system set to the FRET channel to use the 450/490 excitation and 560/580 emission filters. The samples were heated from 25 to 100° C. at a rate of 1° C./min. A fluorescence measurement was carried out every 0.3° C. The melting temperature was determined from the peak(s) of the first derivatives of the melting curve using Bio-Rad CFX Manager software. Tm values are the average of 3 measurements.

TABLE 1

Melting temperature according to enzymes

| PET-degrading enzymes | Tm |
| --- | --- |
| E1: SEQ ID NO: 1 | 84.7° C. |
| E2: SEQ ID NO: 1 + F208I + D203C + S248C + Y92G | 94.0° C. |
| E3: SEQ ID NO: 1 + F208W + D203C + S248C + Y92G | 98.0° C. |
| E4: SEQ ID NO: 1 + F208I + D203C + S248C + V170I + Y92G | 94.6° C. |

Example 3: Reactor Depolymerization Process

The process was performed in a 500 ml Minibio bioreactor (Applikon Biotechnology, Delft, The Netherlands). 0.69 µmol to 1.10 µmol of purified protein (produced in accordance with Example 2.1.) prepared in 80 ml of 100 mM potassium phosphate buffer, pH 8, were combined with 20 g of the PET-containing powder prepared according to Example 1 (Xc=16%, Tg=78.4° C.). Temperature regulation was performed by immersion in a water bath and a single marine turbine was used to maintain constant stirring at 250 rpm. The pH was regulated at 8 with 6 N NaOH and provided by the my-Control bio control system (Applikon Biotechnology, Delft, The Netherlands), and baseline consumption was recorded during the process.

Characterization of the rate of depolymerization of the PET was achieved by regularly collecting samples subjected to ultra-high-performance liquid chromatography (UHPLC) to measure the amount of terephthalic acid equivalent produced as described below. The amount of terephthalic acid produced can also be estimated via the amount of base added to the medium during the reaction.

TA equivalent concentration was determined by chromatography (UHPLC). If necessary (in the presence of insoluble TA), samples were diluted in 100 mM potassium phosphate buffer, pH 8. 150 µL methanol and 6.5 µL 6 N HCl were added to 150 µL of sample or dilution. After homogenization and filtration through a 0.45 µm syringe filter, 20 µL of sample was injected into the Ultimate 3000 UHPLC system (Thermo Fisher Scientific, Waltham, MA) comprising a pump module, an autosampler, a column oven thermostated at 25° C. and a UV detector at 240 nm. Terephthalic acid (TA) and the molecules produced (MHET and BHET) were separated using a gradient of methanol (30% to 90%) in 1 mM H2SO4 at 1 m/min through a Discovery HS C18 HPLC column (150 mm×4.6 mm, 5 µm) equipped with a precolumn (Supelco, Bellefonte, PA). TA, MHET, and BHET were measured according to standard curves prepared from commercial TA and BHET and in-house synthesized MHET. The TA equivalent corresponds to the sum of the measured TA and the TA contained in the measured MHET and BHET.

The enzymes of Example 2 were tested at different temperatures (70° C.±1° C. and 72° C.±1° C.) in order to evaluate which ones could be selected to implement the process of the invention at these different temperatures. The enzymes were thus tested at a saturating concentration. Tests at a temperature of 60° C. were also carried out, the temperature of 60° C. corresponding to the temperature traditionally used in the depolymerization processes of the prior art (negative control).

As a reminder, the crystallization times tR of PET from Example 1.1 to reach 30% and 35% crystallinity are respectively 16 h and 17.5 h at 70° C., and 10 h and 11.5 h at 72° C.

Tables 2, 3, 4, and 5 below show the measurement of times tD of enzymes E1, E2, E3, and E4 at different temperatures, respectively.

TABLE 2

Measurement of times tD of E1 at 60° C. (control) and 72°.

| | | 60° C. | | 72° C. | |
| --- | --- | --- | --- | --- | --- |
| Enzymes | Tm | tD (80%) | tD (90%) | tD (80%) | tD (90%) |
| E1 | 84.7° C. | 28 h | 36 h | Never reached | Never reached |

For E1, tD is thus higher than tR at 72° C. The enzyme therefore cannot be selected for implementation of the process of the invention. One reason is that it is not sufficiently stable and/or active to reach 80% conversion before the PET has reached a degree of crystallinity of more than 30%.

TABLE 3

Measurement of times tD of E2 at 60° C. (control) and 72° C.

| | | 60° C. | | 72° C. | |
|---|---|---|---|---|---|
| Enzymes | Tm | tD (80%) | tD (90%) | tD (80%) | tD (90%) |
| E2 | 94.0° C. | 18 h | 21 h | 6 h | 9 h |

The enzyme E2 can be selected to implement the process of the invention at 72° C. allowing a significant improvement in yield compared with a process at 60° C. (2.3-fold decrease in time to reach 90% depolymerization). E2 has both a sufficiently high Tm (>T+20° C.) and a sufficiently low tD to reach 80% depolymerization before the PET has reached an excessive crystallinity (tR to reach 30% crystallinity=10 h) at 72° C.

TABLE 4

Measurement of times tD of E3 at 72° C.

| | | 72° C. | |
|---|---|---|---|
| Enzymes | Tm | tD (80%) | tD (90%) |
| E3 | 98.0° C. | 7 h | 10 h |

Equivalently to E2, E3 can be selected to implement the process of the invention at 72° C.

TABLE 5

Measurement of times tD of E4 at 60° C. (control), 70° C. and 72° C.

| | | 60° C. | | 70° C. | 72° C. | |
|---|---|---|---|---|---|---|
| Enzymes | Tm | tD (80%) | tD (90%) | tD (80%) | tD (80%) | tD (90%) |
| E4 | 94.6° C. | 17 h | 20 h | 12 h | 7 h | 10 h |

Equivalently to E2 and E3, E4 can also be selected to implement the process of the invention at 70° C. and 72° C., allowing a significant improvement in yield compared with a process at 60° C.

Example 4: Process for Degrading a Plastic Material from Textile Waste Comprising PET 4.1 Measurement of the Crystallization Time (tR) of PET from Textile Waste
4.1.1 Amorphization of PET of Plastic Material from Textile Waste and Measurement of the Degree of Crystallinity of PET The depolymerization process is carried out using production waste from a water jet weaving process, the material of which is in the form of continuous thread clusters and contains approximately 100% PET. These textile materials have undergone a drying step at 60° C. for 16 h, followed by an extrusion step and a rapid cooling to allow the amorphization of the PET contained in the waste. The extruder used for amorphization was a Leistritz ZSE 18 MAXX twin-screw extruder. The temperatures of the heating zones were set according to the following profile:

265° C.-265° C.-265° C.-255° C.-255° C.-250° C.-250° C.-245° C.-245° C.-245° C.

The screw speed was regulated at 150 rpm. The introduction of the material into the extruder was done manually. The rod arriving at the head of the extruder was then immediately immersed in a water bath at 10° C. The resulting rod was granulated and then reduced to a fine powder using a micronizer (1 mm grid). The powder was then subjected to a 500 μm sieve to recover only the powders smaller than this size. The crystallinity of the powder was determined, in accordance with Example 1.2, to be less than 10%.

4.1.2 Measurement of the Crystallization Kinetics of the PET of the Plastic Material The measurement of the crystallization time (tR) of PET from textile waste was carried out with the same protocol as in Example 1.3. At 68° C. the crystallinity of PET in the powder obtained in Example 4.1 changes very little and, after 29 h at 68° C., the crystallinity remains below 20%. The same is true at 60° C.

4.1.3 Measurement of the Tg of the PET

The measurement of the Tg of the PET was performed with the same protocol as Example 1.2. The Tg of the PET powder produced in Example 4.1.1 was assessed at 75.7° C.

4.2 Enzyme Selection by a Process of Reactor Depolymerization of PET Plastic Material from Textile Waste For the depolymerization tests, a dished-bottom reactor with a total volume of 5 L (Global Process Concept) was used. The reactor was equipped with a temperature probe and a pH probe (Hamilton, EasyFerm HB BioArc 325). The regulation of these two parameters at the set values was ensured by PID controllers internal to the C-bio software (Global Process Concept). A 5.5 cm diameter marine paddle attached to the central shaft rotating at 300 rpm provided the stirring of the reaction medium.

For all tests, the pH was regulated to 8.0 by adding 20% m.m. sodium hydroxide. Enzyme E4 was added at a weight ratio of 1:1000 per amount of PET engaged. It was produced by fermentation of a recombinant microorganism in liquid medium.

Table 6 below shows respectively the measurement of times tD of enzyme E4 on the plastic material defined in 4.1.1 at different temperatures.

TABLE 6

Measurement of times tD of E4 at 60° C. and 68° C.

| | | 60° C. | | 68° C. | |
|---|---|---|---|---|---|
| Enzymes | Tm | tD (80%) | tD (90%) | tD (80%) | tD (90%) |
| E4 | 94.0° C. | 18 h | 29 h | 9 h | 13 h | tD remaining lower than tR at 68° C., E4 can thus be selected to implement the process of the invention at 68° C. on the plastic material defined in 4.1.1 while allowing a significant improvement in yield compared with a process at 60° C.

Example 5: Process for Degrading a Plastic Material, from Plastic Waste. Selection and Scaling up

5.1 Measurement of Crystallization time (tR) of PET from Plastic Waste

5.1.1 Amorphization of PET from Plastic Waste Material and Measurement of the Degree of Crystallinity of PET The extruder used for amorphization was a KMB ZE 60A twin-screw extruder equipped with a gear pump, filter changer, die and overhead water cutting system. The temperature was regulated to 265° C. in the extruder zones, to 275° C. in the gear pump, to 275° C. in the filter changer zones and to 350° C. in the die. The rotational speed of the screws was 160 rpm. The water used in the granulation system was regulated to a temperature of 80° C. To introduce the flakes, 2 gravimetric dosing systems marketed by Brabender were used. A flow rate of 300 kg/h was used. For granulation, a die comprising 240 holes of 0.75 mm diameter was used. The cutting speed was 3800 holes/min. Amorphization resulted in granules smaller than 1 mm in size, with a degree of crystallinity measured at 12% (by DSC). The granules then underwent a powder reduction step using a disc pulverizer. The powder was subjected to a 500 µm sieve to recover only the smaller powders. The crystallinity of the powder was determined, in accordance with Example 1.2, to be equal to 16.5% (DSC).

5.1.2 Measurement of the Tg of the PET

The measurement of the Tg of the PET was performed with the same protocol as Example 1.2. The Tg of the PET powder produced in Example 5.1.1 was assessed at 75.2° C.

5.1.3 Measurement of the Crystallization Kinetics of the PET of the Plastic Material The measurement of the crystallization time (tR) of the PET from the plastic material was carried out according to the same protocol as in Example 1.3. At 60° C. and 66° C. the crystallinity of the PET in the powder obtained in Example 5.1 changes very little and, after 30 h at 60° C. or 66° C., the crystallinity remains below 22%. At 72° C., it reaches 30% in 18 h (tR).

5.2 Enzyme Selection by a Process of Reactor Depolymerization of PET Plastic Material from Plastic Waste For test A, a flat-bottom stirred reactor with a total volume of 500 mL (MiniBioreactors, Global Process Concept) was used. It was equipped with a temperature probe and a pH probe (Hamilton, EAsyFerm HB BioArc 120). The regulation of these two parameters at the set values was ensured by internal PID controllers in the C-bio software (Global Process Concept). A 3 cm diameter marine paddle fixed to the central shaft rotating at 300 rpm provided the stirring of the reaction medium.

For tests B and C, a dished-bottom reactor with a total volume of 5 L (Global Process Concept) was used as described in Example 4.2.

For all tests, the pH was regulated at 8.0 by adding 20% m.m. sodium hydroxide. Enzyme E4 was added at a weight ratio of 1:1000 per amount of PET engaged. It was produced by fermentation of a recombinant microorganism in liquid medium.

Table 7 below shows the measurement of times tD of enzyme E4 at different temperatures, respectively.

TABLE 7

| Measurement of times tD of E4 at different temperatures | | | |
|---|---|---|---|
| | A | B | C |
| Reactor volume | 500 mL | 5 L | 5 L |
| T (° C.) | 60 | 66 | 72 |
| tD (80%) | 28 h | 24.4 h | 17.2 h | tD remaining lower than tR, E4 can thus be selected to implement the process of the invention at these two temperatures on the plastic material defined in 5.1.1. It will be noted that the use of E4 at 66° C. and 72° C. should allow a significant improvement in yield compared with a process at 60° C.

5.3 Validation of the Scaling

The preceding steps having validated that enzyme E4 can be selected, the process can be implemented according to the invention.

For this test (D), a flat-bottom reactor with a total volume of 1000 L was used. The reactor was equipped with a temperature probe and a pH probe (In Pro3100/SG/325, Mettler Toledo). A marine paddle of variable diameter provided the stirring of the reaction medium. The pH was regulated at 8.0 by adding sodium hydroxide at 20% m.m. Enzyme E4 was added at a weight ratio of 2:1000 per amount of PET engaged. It was produced by fermentation of a recombinant microorganism in liquid medium.

The degradation carried out at a temperature of 66° C. is followed according to the same methods as described above.

Thus, the 80% and 90% degradation rates are obtained after 14 h and 24 h, respectively.

The results obtained on semi-industrial volumes are thus consistent with those obtained during the selection of the enzyme. It will be noted that the use of larger volumes allows a better stirring and thus an improvement of the yields.

The invention claimed is:

1. A process for enzymatic depolymerization of semi-crystalline polyethylene terephthalate (PET) comprising bringing said semi-crystalline PET into contact with an enzyme capable of depolymerizing said semi-crystalline PET, said enzyme selected from cutinases comprising an amino acid sequence having at least 75% identity with SEQ ID NO:1, and further comprising at least one mutation combination selected from: (i) F208I+D203C+S248C+Y92G, (ii) F208W+D203C+S248C+Y92G, or (iii) F208I+D203C+S248C+V170I+Y92G, corresponding to the residues of SEQ ID NO:1, wherein:
   a) the semi-crystalline PET has an initial degree of crystallinity of at most 25%;
   b) the depolymerization step is carried out at a temperature T equal to the Tg+10° C. of said semi-crystalline PET; and
   c) the enzyme has a depolymerization time (tD) of the semi-crystalline PET that is less than the crystallization time (tR) of said semi-crystalline PET, wherein the time tD represents the time required for said enzyme to depolymerize at least 80% of said semi-crystalline PET at said temperature T, and the time tR represents the time required for said semi-crystalline PET to reach a degree of crystallinity of at most 35% at said temperature T.

2. The depolymerization process as claimed in claim 1, wherein the temperature T is between the Tg−10° C. and the Tg+5° C. of the semi-crystalline PET.

3. The depolymerization process as claimed in claim 1, wherein the temperature T is between 66° C. and 80° C.

4. The depolymerization process as claimed in claim 1, wherein the crystallization time of the semi-crystalline PET is measured prior to the depolymerization step, on a sample of said semi-crystalline PET.

5. The depolymerization process as claimed in claim 1, wherein the selected enzyme has a time tD less than or equal to 20 h.

6. The depolymerization process as claimed in claim 1, wherein the enzyme is selected from enzymes having a melting temperature (Tm) strictly higher than the temperature T.

7. The depolymerization process as claimed in claim 1, wherein the initial degree of crystallinity of the semi-crystalline PET is less than 20%.

8. The depolymerization process as claimed in claim 1, wherein the depolymerization time (tD) is between 1 h and 16 h.

9. The depolymerization process as claimed in claim 1, wherein the semi-crystalline PET is subjected to an amorphization step prior to the depolymerization step.

10. The depolymerization process as claimed in claim 1, wherein the time tD represents the time required for said enzyme to depolymerize at least 90% of said semi-crystalline PET at said temperature T, and the time tR represents the time required for said semi-crystalline PET to reach a degree of crystallinity of at most 30% at said temperature T.

11. The depolymerization process as claimed in claim 1, wherein:
   a) the semi-crystalline PET has an initial degree of crystallinity of at most 25% and a Tg between 65° C.±1° C. and 80° C.±1° C.;
   b) the depolymerization step is carried out at a temperature T of 72° C.±1° C.; and
   c) the enzyme has a depolymerization time (tD) of the semi-crystalline PET that is less than the crystallization time (tR) of said semi-crystalline PET, wherein the time tD represents the time required for the selected enzyme to depolymerize at least 80% of said semi-crystalline PET at said temperature T, and the time tR represents the time required for said semi-crystalline PET to reach a degree of crystallinity of at most 35% at said temperature T.

12. The depolymerization process as claimed in claim 1, wherein:
a) a plastic material is selected from fibers and/or fiber and/or textile waste comprising semi-crystalline PET with an initial degree of crystallinity of at most 25% and a Tg between 60° C.±1° C. and 75° C.±1° C.;
b) the depolymerization step is carried out at a temperature T of 65° C.±1° C.; and
c) the enzyme capable of degrading semi-crystalline PET has a depolymerization time (tD) of the semi-crystalline PET that is less than the crystallization time (tR) of said semi-crystalline PET, wherein the time tD represents the time required for the selected enzyme to depolymerize at least 80% of said semi-crystalline PET at said temperature T, and the time tR represents the time required for said semi-crystalline PET to reach a degree of crystallinity of at most 35% at said temperature T.

13. The depolymerization process as claimed in claim 1, wherein the temperature T is between 68° C. and 73° C.

14. The depolymerization process as claimed in claim 1, wherein the depolymerization time (tD) is between 1 h and 10 h.

15. The depolymerization process as claimed in claim 1, wherein the cutinase has at least 75% identity with SEQ ID NO:1 and comprises the mutation combination F208I+D203C+S248C+Y92G, corresponding to the residues of SEQ ID NO:1.

16. The depolymerization process as claimed in claim 1, wherein the cutinase has at least 75% identity with SEQ ID NO:1 and comprises the mutation combination F208W+D203C+S248C+Y92G, corresponding to the residues of SEQ ID NO: 1.

17. The depolymerization process as claimed in claim 1, wherein the cutinase has at least 75% identity with SEQ ID NO:1 and comprises the mutation combination selected from: (i) F208I+D203C+S248C+Y92G, or (iii) F208I+D203C+S248C+V170I+Y92G, corresponding to the residues of SEQ ID NO:1.

* * * * *